United States Patent
Oda et al.

(10) Patent No.: US 11,113,638 B2
(45) Date of Patent: Sep. 7, 2021

(54) OPTIMIZED PARTS PICKUP LIST AND ROUTES FOR EFFICIENT MANUFACTURING USING FREQUENT PATTERN MINING AND VISUALIZATION

(71) Applicant: FUJIFILM Business Innovation Corp., Tokyo (JP)

(72) Inventors: Hideto Oda, Kanagawa (JP); Chidansh Amitkumar Bhatt, Mountain View, CA (US); Jian Zhao, Cupertino, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 104 days.

(21) Appl. No.: 16/246,792

(22) Filed: Jan. 14, 2019

(65) Prior Publication Data
US 2020/0226505 A1    Jul. 16, 2020

(51) Int. Cl.
G06Q 10/08    (2012.01)
G06Q 10/04    (2012.01)
G06Q 50/04    (2012.01)

(52) U.S. Cl.
CPC .......... *G06Q 10/047* (2013.01); *G06Q 50/04* (2013.01)

(58) Field of Classification Search
CPC ....... G06Q 10/047; G06Q 50/04; G06Q 10/08
(Continued)

(56) References Cited

U.S. PATENT DOCUMENTS

2007/0077943 A1* 4/2007 Hamilia ............... G06Q 10/087
                                                            455/456.1
2009/0307265 A1* 12/2009 Nicholson ............ G06Q 10/087
(Continued)

FOREIGN PATENT DOCUMENTS

WO    WO-2017059140 A1 *  4/2017 ............. G06Q 50/28

OTHER PUBLICATIONS

C. Dudas, T. Aslam and A. Ng, "Frequent itemset mining to generate initial solutions for simulation-based optimization of warehouse product placement," 2010 8th International Conference on Supply Chain Management and Information, 2010, pp. 1-6. (Year: 2010).*
(Continued)

*Primary Examiner* — Patricia H Munson
*Assistant Examiner* — Jeremy L Gunn
(74) *Attorney, Agent, or Firm* — Procopio, Cory, Hargreaves & Savitch LLP

(57) ABSTRACT

Example implementations described herein are directed to an interface for a worker dispatch system configured to dispatch routes and schedules for workers on a manufacturing floor. Example implementations can involve a system configured to execute a lot ordering and route optimization for each of a plurality of workers; determine rack placement of the plurality of racks and total travel distance for each worker; generate a deployment plan for each worker from the lot ordering, the route optimization, the rack placement, and the total travel distance, the deployment plan involving a pick-up route and a schedule for each worker; provide the deployment plan to an interface configured to receive modifications to the deployment plan; and upon receiving instructions to deploy the deployment plan through the interface, provide the deployment plan to a device of each worker.

16 Claims, 10 Drawing Sheets

(58) Field of Classification Search
USPC .................................................. 705/7.26
See application file for complete search history.

(56) References Cited

U.S. PATENT DOCUMENTS

| | | | | |
|---|---|---|---|---|
| 2010/0218131 A1* | 8/2010 | Holm-Petersen | .... | G06Q 10/087 715/771 |
| 2012/0079810 A1* | 4/2012 | Abe | ...... | E02F 9/0866 60/272 |
| 2012/0130964 A1* | 5/2012 | Yen | ......... | G06Q 30/02 707/693 |
| 2014/0156553 A1* | 6/2014 | Leach | .............. | G06Q 10/08355 705/338 |
| 2014/0279294 A1* | 9/2014 | Field-Darragh | ..... | H04B 5/0062 705/28 |
| 2018/0025460 A1* | 1/2018 | Watanabe | ............ | G06Q 10/047 705/28 |
| 2018/0075036 A1* | 3/2018 | Fuchs | ................. | G06F 16/2228 |
| 2018/0330316 A1* | 11/2018 | Rajkhowa | ......... | G06Q 10/06316 |
| 2019/0266555 A1* | 8/2019 | Rajkhowa | ...... | G06Q 10/063114 |
| 2019/0303819 A1* | 10/2019 | Lem | ........................ | G06Q 10/08 |
| 2019/0310655 A1* | 10/2019 | Voorhies | ................. | B66F 9/063 |
| 2020/0103921 A1* | 4/2020 | Voorhies | .............. | G05D 1/0287 |

OTHER PUBLICATIONS

Hirayama, J., et al., Use of AI in the Logistic Sector: Case Study of Improving Productivity in Warehouse Work, Hitachi Review, 2016, 65(6), pp. 134-138.

Aloysius, G., et al., An Approach to Products Placement in Supermarkets Using PrefixSpan Algorithm, Journal of King Saud University—Computer and Information Sciences, 2013, 25, pp. 77-87.

Nafari, M., et al., A Temporal Data Mining Approach for Shelf-Space Allocation With Consideration of Product Price, Expert Systems with Applications, 2010, 37, pp. 4066-4072.

* cited by examiner

OPTIMIZED PARTS PICKUP LIST AND ROUTES FOR EFFICIENT MANUFACTURING USING FREQUENT PATTERN MINING AND VISUALIZATION

BACKGROUND

Field

The present disclosure relates generally to manufacturing environments and more specifically, for generation of optimized automated parts pick-up lists.

Related Art

In the related art, manufacturing environments requires change in work procedures and settings based on changes in the demand of products and type of products for production. Such frequent changes have been expensive in terms of resource re-organization and additional time of worker adaptation to changes, and have made it difficult to issue efficient work instructions rapidly to respond to new improvement activities or environment changes.

SUMMARY

Example implementations described herein involve an artificial intelligence (AI) driven method using data from daily work gathered by the work system, to issue appropriate work instructions in terms of optimized parts pick-up list and routes. Existing manufacturing workflows utilize manual lists created by the manager for items to be picked-up by workers (e.g., such manual list has a random order for items to be picked-up, non-fixed route and non-fixed schedule) for delivering to assembly line. Example implementations are directed to the improvement of the efficiency of manufacturing by generating an optimized automated parts pick-up list through leveraging the frequent pattern mining and travelling salesman algorithm-based solution for optimal pick-up routes, as well as incorporating domain knowledge and different manufacturing constraints via an interactive visualization for real-time adaptive decision making.

Aspects of the present disclosure involve a method, which can include executing a lot ordering and route optimization for each of a plurality of workers on a manufacturing floor comprising a plurality of racks and a plurality of lots; determining rack placement and total travel distance for the each of the plurality of workers; generating a deployment plan for the each of the plurality of workers from the lot ordering, the route optimization, the rack placement, and the total travel distance, the deployment plan comprising a pick-up route and a schedule for the each of the plurality of workers; providing the deployment plan to an interface configured to receive modifications to the deployment plan; and upon receiving instructions to deploy the deployment plan through the interface, providing the deployment plan to a device of each of the plurality of workers.

Aspects of the present disclosure involve a non-transitory computer readable medium, storing instructions for executing a process, which can include executing a lot ordering and route optimization for each of a plurality of workers on a manufacturing floor comprising a plurality of racks and a plurality of lots; determining rack placement and total travel distance for the each of the plurality of workers; generating a deployment plan for the each of the plurality of workers from the lot ordering, the route optimization, the rack placement, and the total travel distance, the deployment plan comprising a pick-up route and a schedule for the each of the plurality of workers; providing the deployment plan to an interface configured to receive modifications to the deployment plan; and upon receiving instructions to deploy the deployment plan through the interface, providing the deployment plan to a device of each of the plurality of workers.

Aspects of the present disclosure involve a management system, involving a processor, configured to execute a lot ordering and route optimization for each of a plurality of workers on a manufacturing floor comprising a plurality of lots associated with a plurality of racks; determine rack placement of the plurality of racks and total travel distance for the each of the plurality of workers; generate a deployment plan for the each of the plurality of workers from the lot ordering, the route optimization, the rack placement, and the total travel distance, the deployment plan comprising a pick-up route and a schedule for the each of the plurality of workers; provide the deployment plan to an interface configured to receive modifications to the deployment plan; and upon receiving instructions to deploy the deployment plan through the interface, provide the deployment plan to a device of each of the plurality of workers.

DETAILED DESCRIPTION

Figure 1:
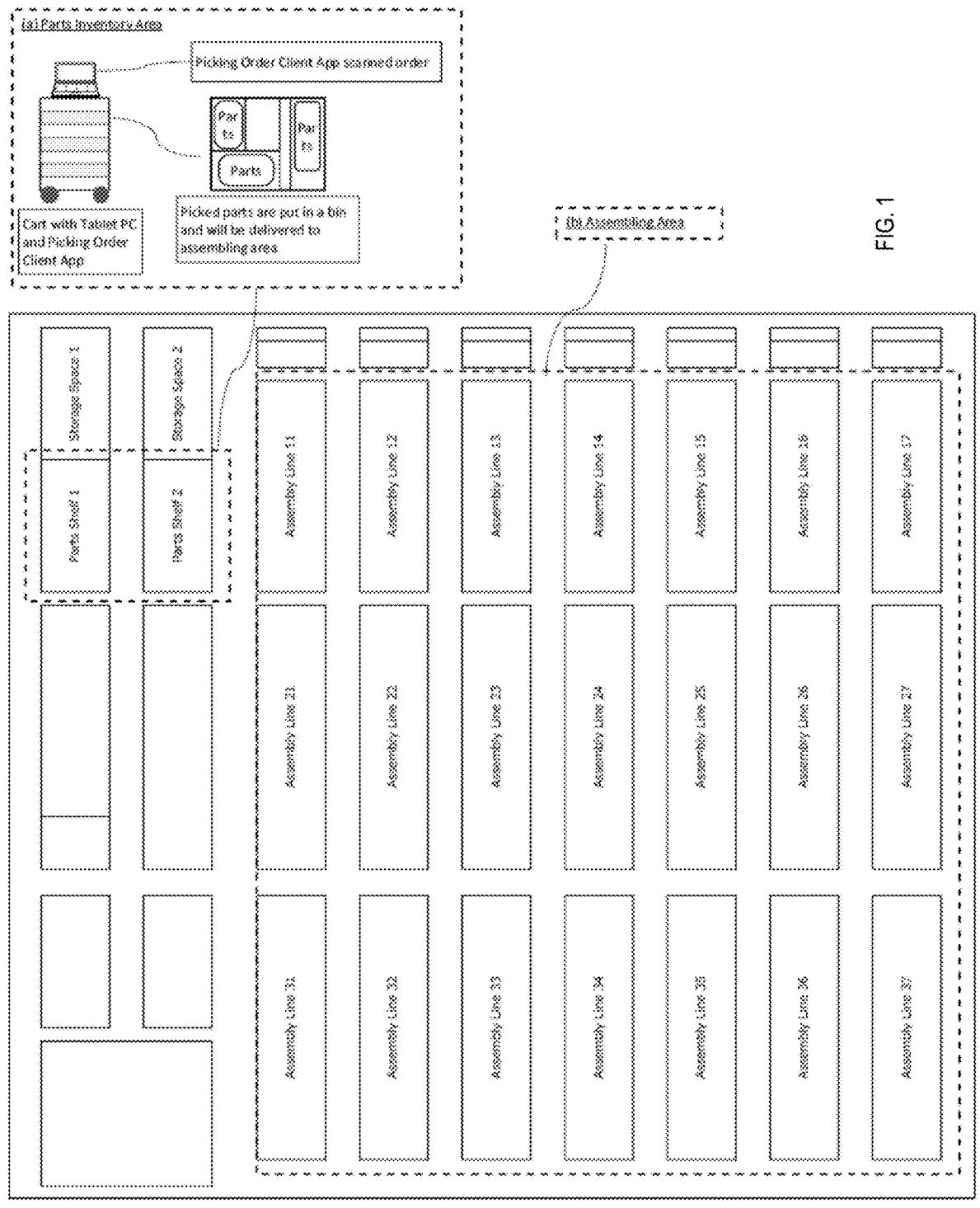
FIG. 1 illustrates an example manufacturing environment floorplan.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The problem in the factory environment is to decide what combination of parts and shelves provide the shortest pick-up time from parts inventory area for workers to maximize the parts-delivery throughput to assembling area. Additional problems involve minimizing the labor cost for overall manufacturing by enabling the manufacturing manager/planner to make more informed decisions to allocate sufficient (e.g., minimal) staff without disrupting the production.

Traditionally, the most similar application of frequent pattern mining is market basket analysis. Market basket analysis determines which products should be placed next to each other using frequent sequence pattern mining or association rule mining techniques. It is similar problem to the proposed manufacturing problem in some aspects. Example implementations described herein involve several differences in terms of the overall objective for manufacturing which involve minimizing the total travel distance which is different from the objective for supermarket is to maximize the profits by placing different category items together and optimizing the layout to increase the travel distances of customer by increasing their unplanned impulsive purchases. Most of the market basket analysis uses frequent pattern mining techniques without the need to incorporate domain constraints, expert knowledge or other environmental factors (e.g., different layouts/capacity for different stores).

Such problems are very prominent in the manufacturing industry as the production environment are changing more frequently based on the production demand and new products or event frequently changing staff that needs to get familiar with the dynamic environments. Thus, example implementations described herein involve a system that considers such constraints from domain experts and provide them real-time adaptive decision-making capability. Also, market basket analysis does not consider issues like potential travelling paths and congestion of customers, in the manufacturing/warehouse environments these are more prominent problems to resolve along with item placements. Thus, example implementations described herein also incorporate the combinatorial optimization techniques like travelling salesman problem (TSP) solver with refinements for finding optimized travel routes for each worker to minimize the travel distance as well as avoid the congestion/collision among workers.

Example implementations described herein involve domain expert knowledge and uncertain constraints on the fly using interactive visualization into proposed data mining algorithms to provide real-time informed decision-making capability. Some trajectory visualization techniques have been proposed using animations, heatmaps, and 3D representations, but they do not focus on manufacturing or indoor scenarios.

FIG. 1 illustrates an example manufacturing environment floorplan. As shown in FIG. 1, parts from the inventory area need to be brought to the assembly area on time to keep the production running smoothly. The issue with inventory management is that it can be more difficult to re-arrange optimal inventory every time a new product production is requested (e.g., due to time-based supply and demand changes). Further, in related art implementations the lot item parts pick-up lists are generated without optimally incorporating the existing inventory (item) layout context and thus workers end-up picking items with a non-fixed route (e.g., going back and forth several times to the same lane or racks or sections for picking items) and with a non-fixed schedule (e.g., difficult to predict the exact pick-up times as different employees will pick the items differently without fixed route).

Figure 2:
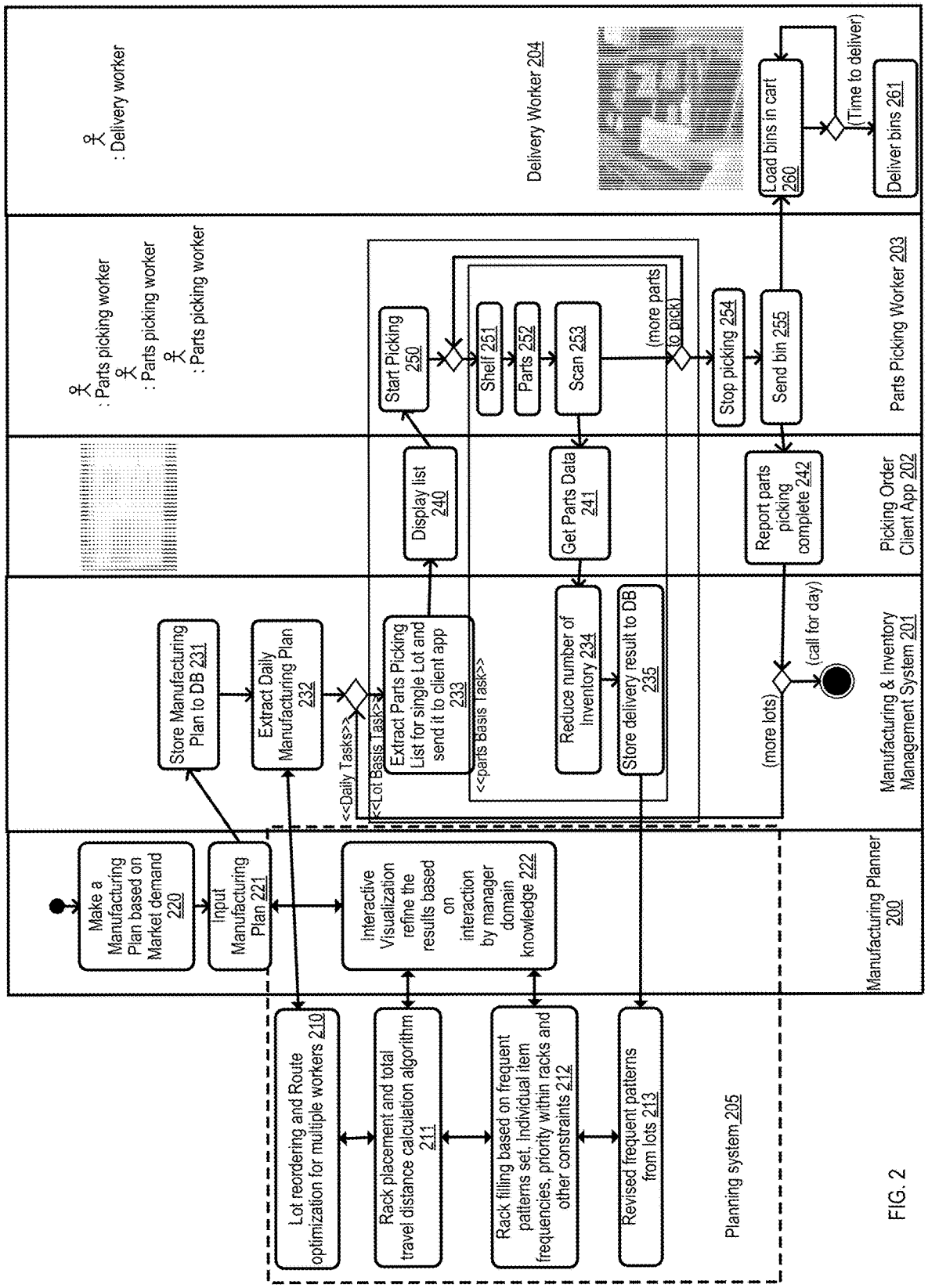
FIG. 2 illustrates an example of the planning system as it interacts with a factory floor, in accordance with an example implementation.

FIG. 2 illustrates an example of the planning system as it interacts with a factory floor, in accordance with an example implementation. As illustrated in FIG. 2, existing factory inventory planning are integrated into the planning system by following the operations as described. Example implementations provide AI enabled planning and visualization component to help the manufacturing planner make more informed decisions according to real-time requirements or constraints in the manufacturing factory.

As illustrated in FIG. 2, the planning system 205 interacts with the factory floor which can involve a manufacturing planner 200, a manufacturing and inventory management system 201, a picking order client application 202, parts picking workers 203, and delivery workers 204.

The manufacturing planner 200 oversees the operations of the factory floor and utilizes the planning system 205 to make a manufacturing plan based on market demand (e.g., monthly, quarterly, annually) at 220. At 221, the plan is input into the planning system 205 for visualization on an interface. At 222, an interactive visualization interface is provided by the planning system 205 to allow the manufacturing planner 200 to refine the results according to the domain knowledge of the manager.

The planning system 205 executes a process for lot reordering and route optimization for multiple workers of the factory floor at 210. At 211, the planning system 205 executes the rack placement and total travel distance calculation algorithm. At 212, the planning system 205 executes rack filling based on the frequent pattern set, individual item frequencies, priority within racks and other constraints. At 213 the planning system 205 revises frequent patterns from lots from results of the database of the manufacturing and inventory management system.

Manufacturing and inventory management system 201 is a system that involves a database for managing the data of the factory floor, such as an enterprise resource planning (ERP) system. At 231, the manufacturing and inventory management system 201 stores the manufacturing plan to the database (DB). At 232, the manufacturing and inventory management system 201 extracts the daily manufacturing plan from the database and as optimized by the lot reordering and route optimization 210 from the planning system 205. The daily tasks are then executed in terms of lot basis tasks and parts basis tasks. For the lot basis tasks, the management system 201 extracts the parts picking list for a single lot and sends it to the client application 202 at 233. For the parts basis tasks, the management system 201 reduces the number of inventory based on the parts data received from the client application 202 at 234, and send the delivery results to the database at 235 while providing feedback to the planning system 205 to revise the frequented patterns from the lots.

The picking order client application 202 is an application executed on a device of a parts picking worker 203 to inform the parts picking worker 203 the list of parts to be obtained that day and in what order. Picking order client application involves a display list 240 that displays the list of parts to be picked up that day and in what order. Picking order client application 202 also obtains parts data at 241 from the scanned barcode of picked parts 253 and provides the information to the management system 201 to reduce the number of inventory at 234. When the parts picking worker 203 is done picking the parts for the day, the parts picking worker 203 will report that the picking of parts is done at 242 in the picking order client application 202, which is reported to the management system 201 to end the process for the day for that worker.

The factory floor will involve one or more parts picking workers 203. Example implementations described herein are directed to providing an effective route and list for parts picking to reduce the number of parts picking workers 203, thereby saving on labor cost. In example implementations described herein, parts picking workers 203 utilize the picking order client application 202 to display a list 240, wherein the parts picking workers 203 start the part picking process accordingly. At 251, the parts picking workers 203 will go to the designated shelf and at 252, the parts picking workers 203 pick up the parts. At 253, the parts picking workers 203 scan their picked parts, which are fed into the client application 202 as parts data 241. If there are more parts to pick, then the parts picking worker 203 proceeds to the next entry on the list and goes to the next shelf, otherwise they stop picking at 254. At 255, after the designated parts are picked and binned, the parts picking worker 203 sends the bin to the delivery worker 204 and reports that the parts picking process is done in the client application 202 at 242.

The factory floor will also involve one or more delivery workers 204 who will take the bins provided by the parts picking worker 203 and load them to a cart at 260, then deliver the bins to the assembling area at the appropriate time at 261.

Route Optimizing

In example implementations described herein, a three stage approach is utilized. In the first stage, example implementations mine frequent maximal itemsets by applying algorithms such as the FPMax Algorithm on the parts delivery database to determine: (a) frequently closed itemsets—a frequent itemset that is not included in a proper superset having the same support and (b) frequently maximal itemset—a frequent itemset that is not included in a proper superset that is a frequent itemset. Example implementations minimize large numbers of redundant frequent patterns and determine the greatest number of items that are frequently used together across diverse production scenarios that can be placed together.

Once such frequent maximal itemsets are determined, example implementations sort the itemsets based on their length (e.g., number of unique items in the patterns) and revise the support of other patterns iteratively as the already selected items are removed from the other frequent patterns (e.g., based on the constraint that the item is placed in one location). Thus, in turn, example implementations iteratively refine the discovered patterns support and length until all the items are consumed.

In example implementations, item-level constraints can be incorporated while placing them in the rack along with their strongly associated items based on the individual items frequency (assuming highly frequent item within the itemset might be utilized much often than other items in the itemset). Further, the location of placing such high priority items within the racks can be selected in example implementations, by assuming that it is easier to pick up items from the middle section of the rack compared to the lower or upper sections of the rack.

In the second stage, example implementations identify the optimal location of placing the racks such that they have distribution of frequent items such that overall distance travelled by the workers to pick-up the parts irrespective of the different productions remain minimal. Additionally, example implementations incorporate the constraint that multiple workers working on picking-up the inventory items at same time are not congesting the routes. Such optimizations ensure that not all the most frequent item racks are placed together and distrusted such that it allows for multiple workers to move around efficiently without congesting the lane, racks or sections for picking-up the items.

To address the above issues and minimize the travel distance, example implementations utilize a floor plan and generate the hybrid distance combining the Manhattan distances between the all the racks (as these racks are mostly arranged in block-wise patterns) and add the threshold distance multiplied with number of rack-lanes required to change between these racks to get more accurate approximation of the distance travelled. Such representative distances can be converted to real distance based on incorporating the actual floor plan with a different layout and the size of rows or columns from the inventory map. Thus, example implementations can be adaptable to any different inventory layouts.

Then in the third-stage, example implementations incorporate the inventory context in terms of item placement information within racks and the computed distances between the racks to generate the ordered list of pick-up items for each lot. Further, example implementations generate the unique pick-up list for each worker to avoid the collision or congestion while picking up the similar items for the lot. In turn, example implementations produced fixed item pick-up routes and approximately fixed scheduled for item pick-ups to optimize the overall operation for collecting the items from inventory and sending it to the assembling line.

On top of the proposed methodology for calculating the unique routes for each worker with optimal rack and item placements algorithms, example implementations described herein also provide the manufacturing managers to incorporate their expertise and domain knowledge as well as real-time constraints with help of visualization that in turn provides the analytics results while managers interact with the visual system.

Figure 3:
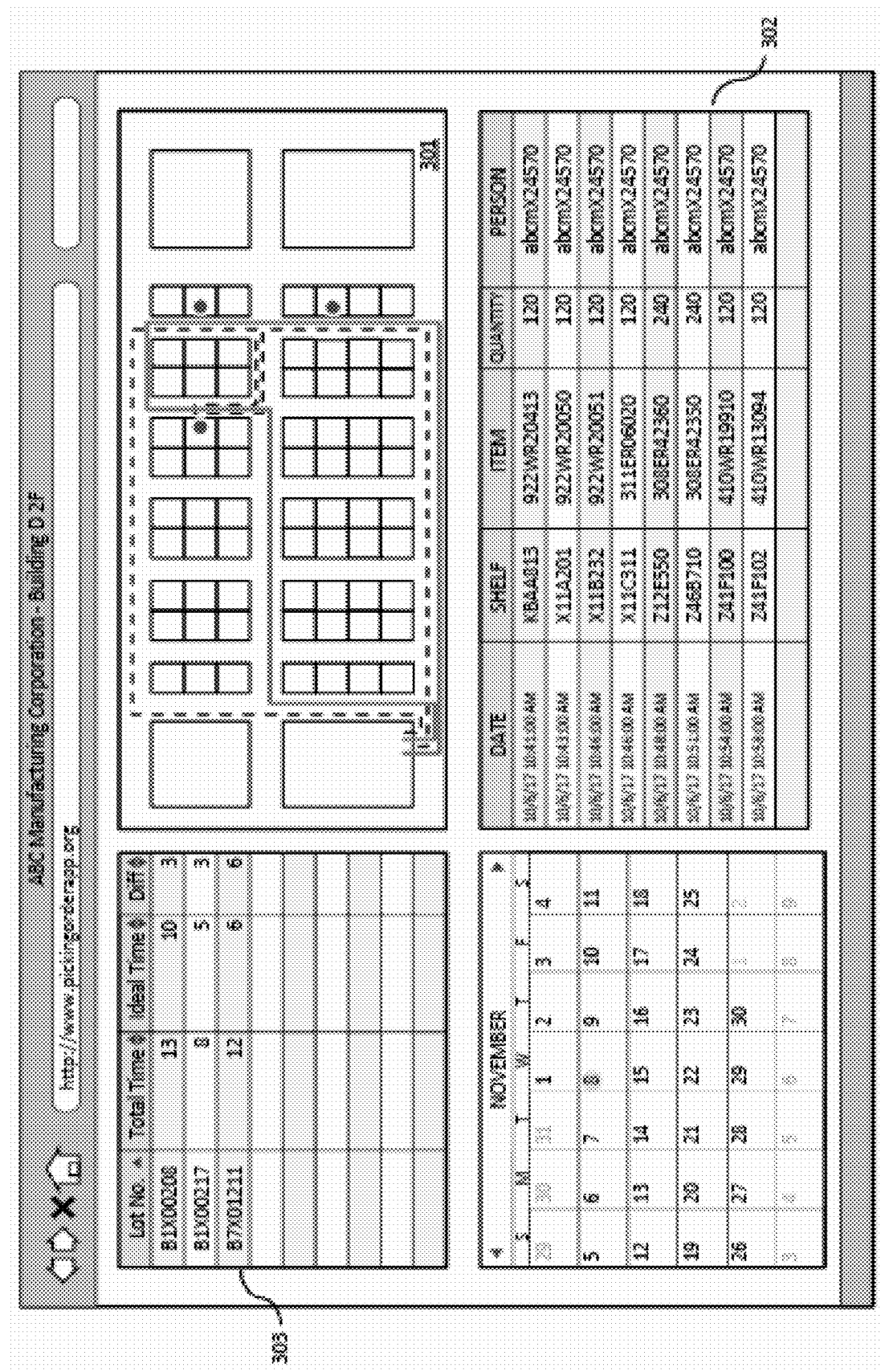
FIG. 3 illustrates an example screenshot of a visualization system, in accordance with an example implementation.

FIG. 3 illustrates an example screenshot of a visualization system, in accordance with an example implementation. As shown in FIG. 3, the system displays an overview and a detailed view of the lots on a selected date, as well as a floor map 301 of the factory with the selected trajectory that was actually taken and its optimization. These views are interactively linked, and the floor map supports a multi-scale exploration with zooming and panning interactions. Other widgets can include the actions taken on the factory floor 302 (delivery times, pick up times, etc.) as well as the daily planner for lots 303.

Figure 4A:
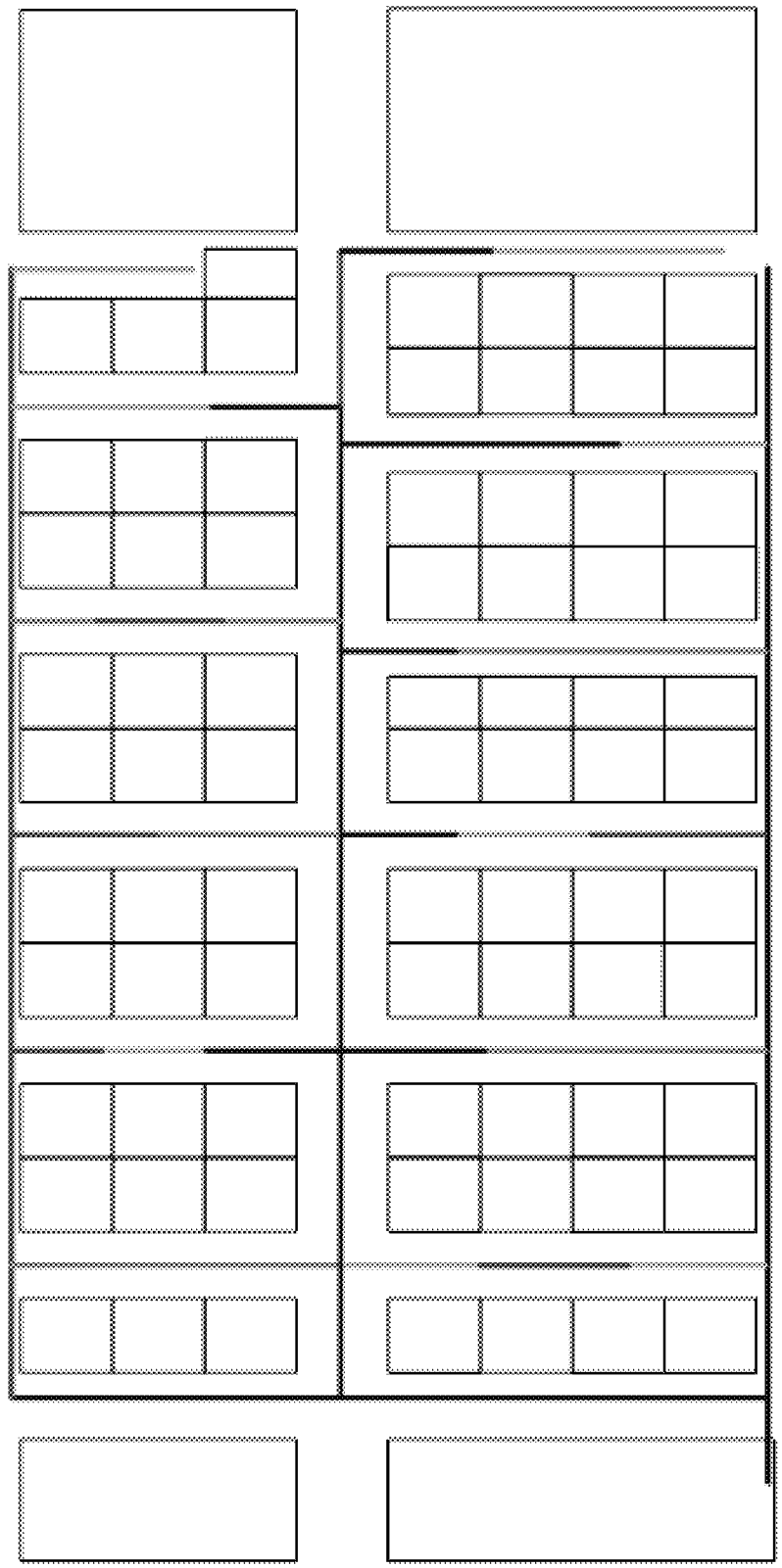
FIGS. 4(a) and 4(b) illustrate example screenshots of aggregated views of trajectories, in accordance with an example implementation.
Figure 4B:
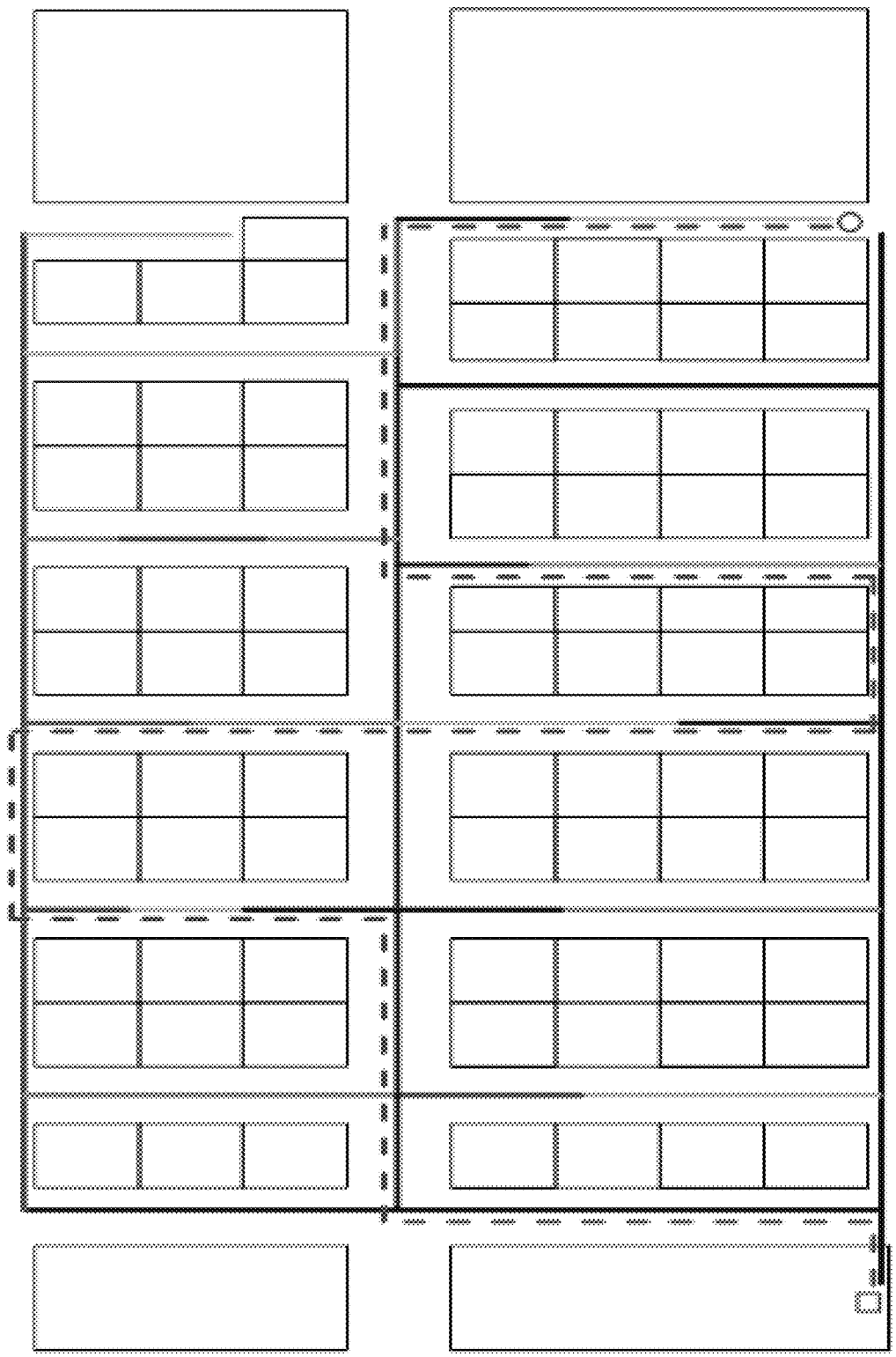

FIGS. 4(a) and 4(b) illustrate example screenshots of aggregated views of trajectories, in accordance with an example implementation. In addition to viewing individual optimized trajectories, a manager can obtain an aggregated view of all the optimized trajectories with a selected time range. As shown in FIG. 4 (top), the frequencies of segments of the trajectories are mapped to greyscale, with darker colors indicating higher frequency, however a color scheme can also be utilized in accordance with the desired implementation (e.g., yellow to red). From this visualization, a manager can investigate which parts of the factory are frequently navigated by workers, thus getting a bigger picture about the behaviors and productivity of the workers.

The manager can further explore individual trajectories as indicated by the dashed line in FIG. 4(b), once selected from the interface.

Figure 5:
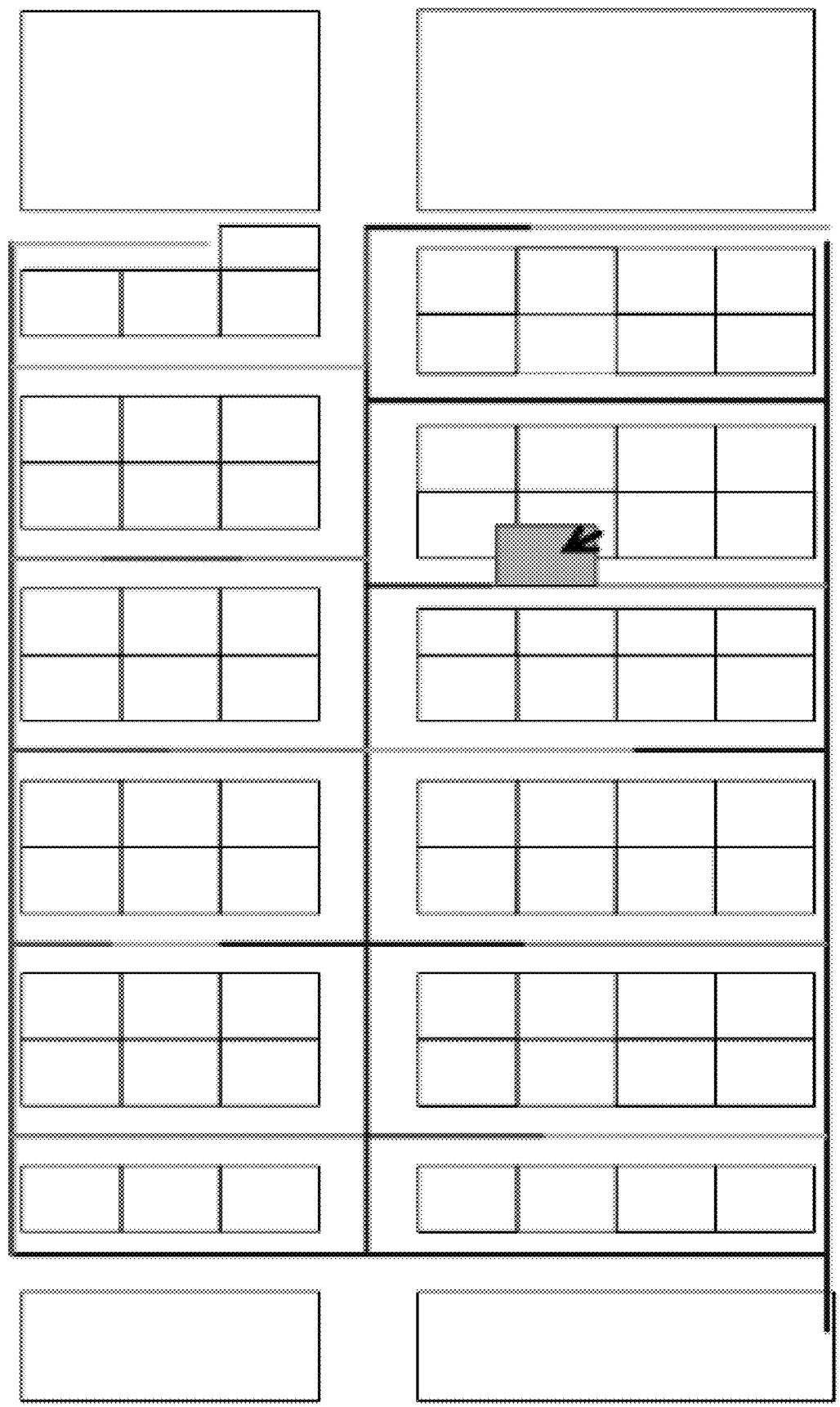
FIG. 5 illustrates an example screenshot of a drag and drop operation on the interface, in accordance with an example implementation.

FIG. 5 illustrates an example screenshot of a drag and drop operation on the interface, in accordance with an example implementation. Based on the domain knowledge of the manager, the manager can interactively rearrange the lots using drag-and drops as shown in FIG. 5. For example, should a manager can find that certain items cannot be placed with some other items due to their size or other potential hazards, the manager can use visualization to make changes in the produced results of item placements and re-arranged the item to other suitable racks. Then the example implementations will reflect such changes in terms of total travel distance with these changes compared to the previous arrangement. Once the new position is determined, the system re-runs the analysis and updates the aggregated visualization of the trajectories. Different placements can be saved and compared using the system, allowing for interactive trials of different plans by assessing their advantages and disadvantages.

Similarly, if there is some accident or events due to which certain rows or columns in the inventory are not accessible, then the managers can block them out interacting with visualization system and the system will automatically re-generate the fixed paths and schedules for each worker for parts pick-up reflecting new travel distances based on the constraints. Through such example implementations, managers can make an informed decision each time based on the situation and improve planning for smooth production operations.

Figure 6:
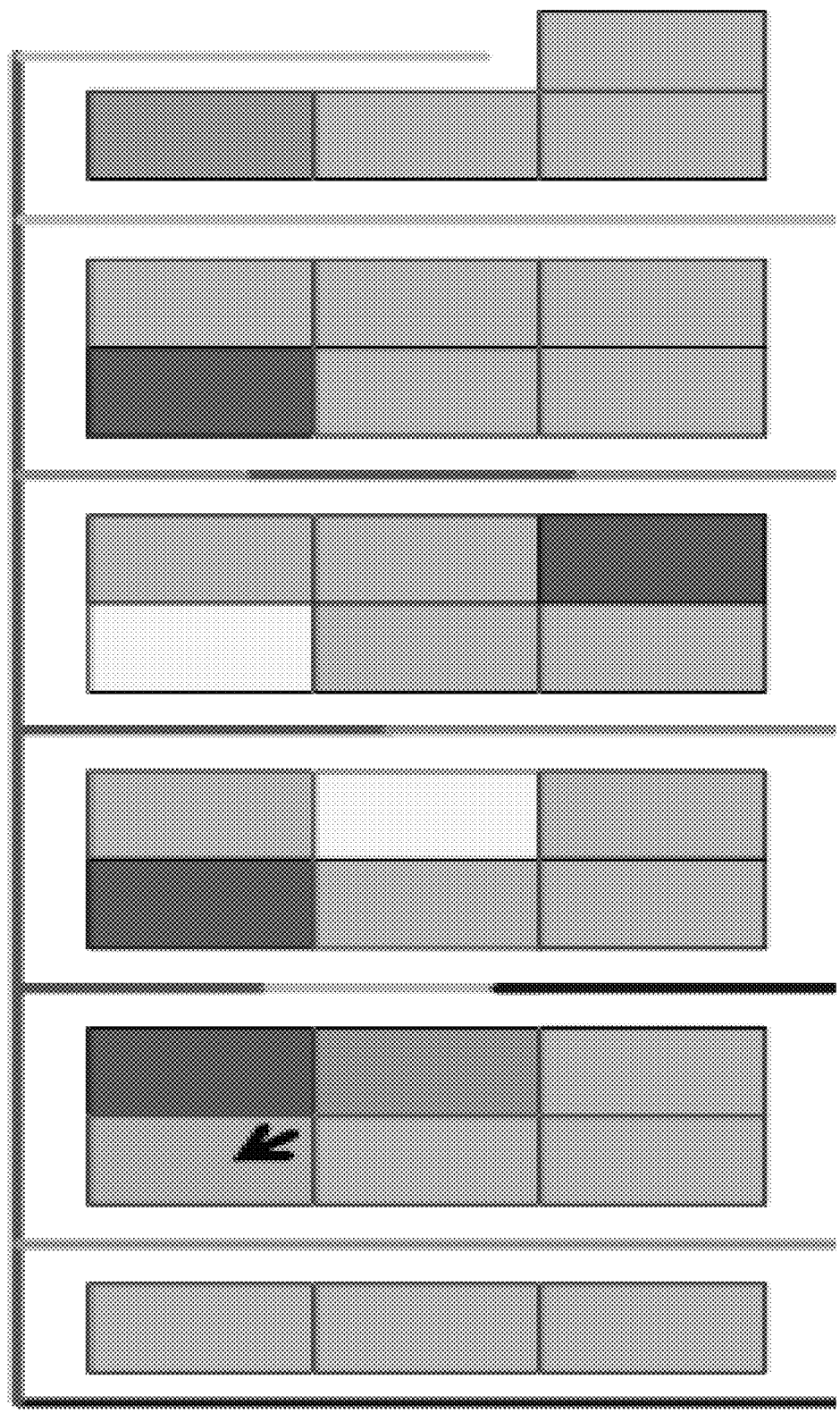
FIG. 6 illustrates an example visualization of lots association, in accordance with an example implementation.

On top of the aggregated visualization of the trajectories, another information that can help a manager for assessing different placements of the lots is the association of the lots based on the parts picked-up by the workers. FIG. 6 illustrates an example visualization of lots association, in accordance with an example implementation. As shown in FIG. 6, the manager selects the lot (shown by the cursor arrow), and all the associated lots can be color-coded (e.g., yellow to red scale, where red means more parts are picked up together with those in the selected lot) or grayscale coded (e.g., light to dark, where dark means more parts picked up). Lots that are not associated with the selected one are colored darker (e.g., in gray). Based on this association map, the manager can obtain a more in-depth view of the placement of the lots, thus helping the manager further optimize the solution based on the algorithm outputs.

In an example implementation, inventory parts pick-up data is implemented in a database, with each entry indicative of an item identifier (ID), quantity, rack layout, pickup time, item location and lot number which indicates the item being part of an item group that is delivered together. Each lot needs to be delivered to the assembly line.

In an experimental test implementation of the example implementations described herein, a factory associated with a database with 9,444 lots was tested and then the dataset was filtered based on the number of workers working concurrently for the parts pick-up task (e.g., less than 2 workers at a time) as well the pick-up time constraints (e.g., taking more than 5-minutes for an item). The filtered dataset was 3,124 lots of information.

Applying the FPmax pattern mining according to example implementations resulted in a total frequent closed maximal itemset of 105 patterns (Average number of items per pattern: 6.5, Standard Deviation: 6.6, Variance: 44) with 351 distinct items. To identify baseline improvement, the existing placement of racks and items of the factory was considered. Then the existing layout context was incorporated to generate the order-list of items and then the travelling salesman problem (TSP) solution was applied for finding the efficient routes. The maximum number of rack locations are 20 for the given dataset. In the test implementation, the brute force TSP algorithm was applied to obtain an optimized path when the number of locations is less than 7. In other cases, the greedy TSP algorithm was applied to obtain a quasi-optimized path. Using such a baseline approach, example implementations were able to achieve 12% reduction in total travelling distance (original total travelling distance for workers is 202,352 meters and after applying baseline method total travelling distance was reduced to 177,610 meters) for the filtered dataset. Although existing baseline results can be very useful for enhancing the efficiency of the factory with their existing racks and items set-up, example implementations further enhanced the efficiency of factory in the test implementation by leveraging results from optimal item placement and rack arrangement. Example implementations can provide more efficient solution in terms of reduction in total travelling distance and in turn reduce the labor cost with more accurate fixed-route and fixed-scheduling time for parts pick-up.

Figure 7A:
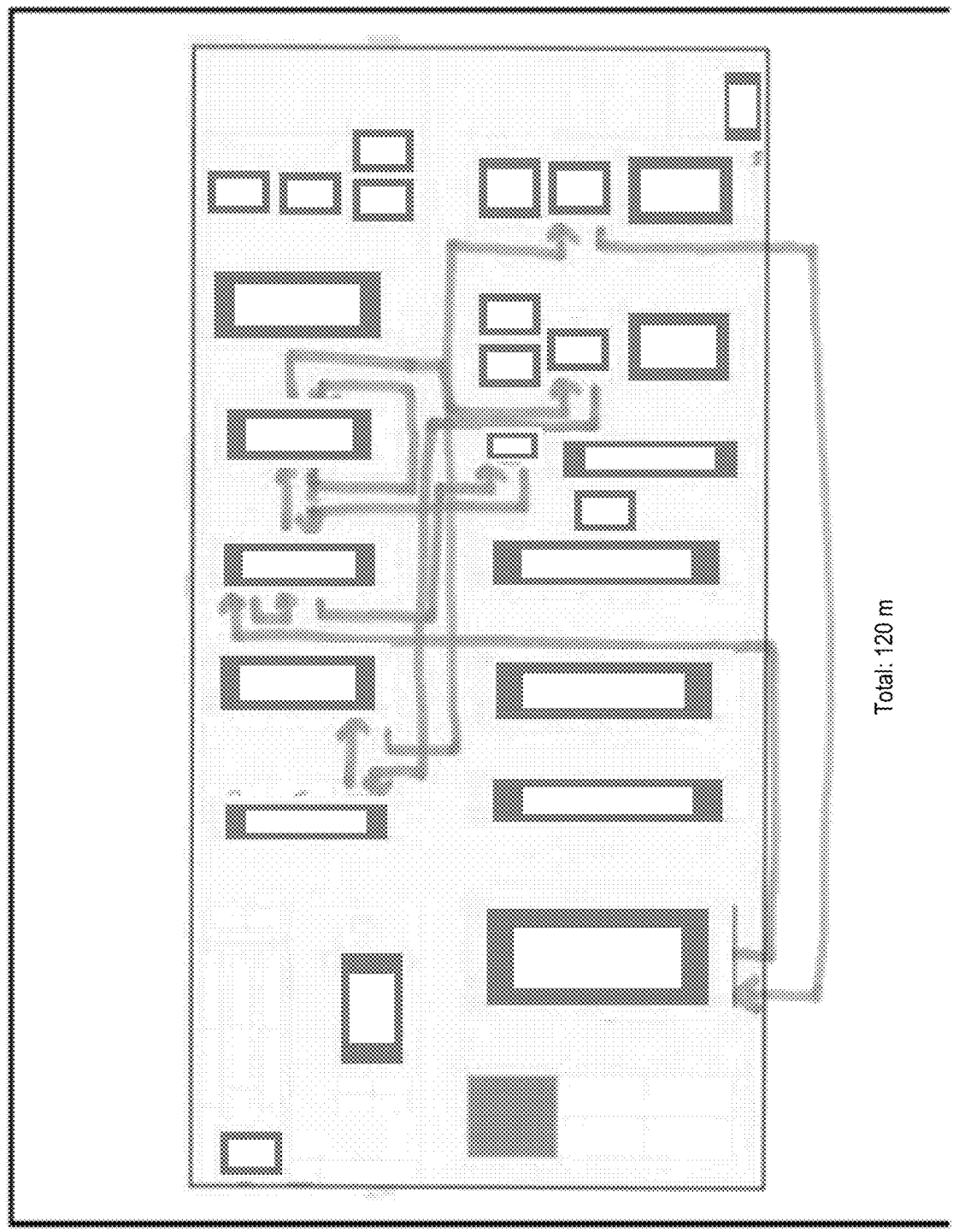
FIG. 7(a) illustrates an example of a parts-pickup route for a lot, with lines indicating the non-fixed route based on distance travelled by worker to pick-up the parts.
Figure 7B:
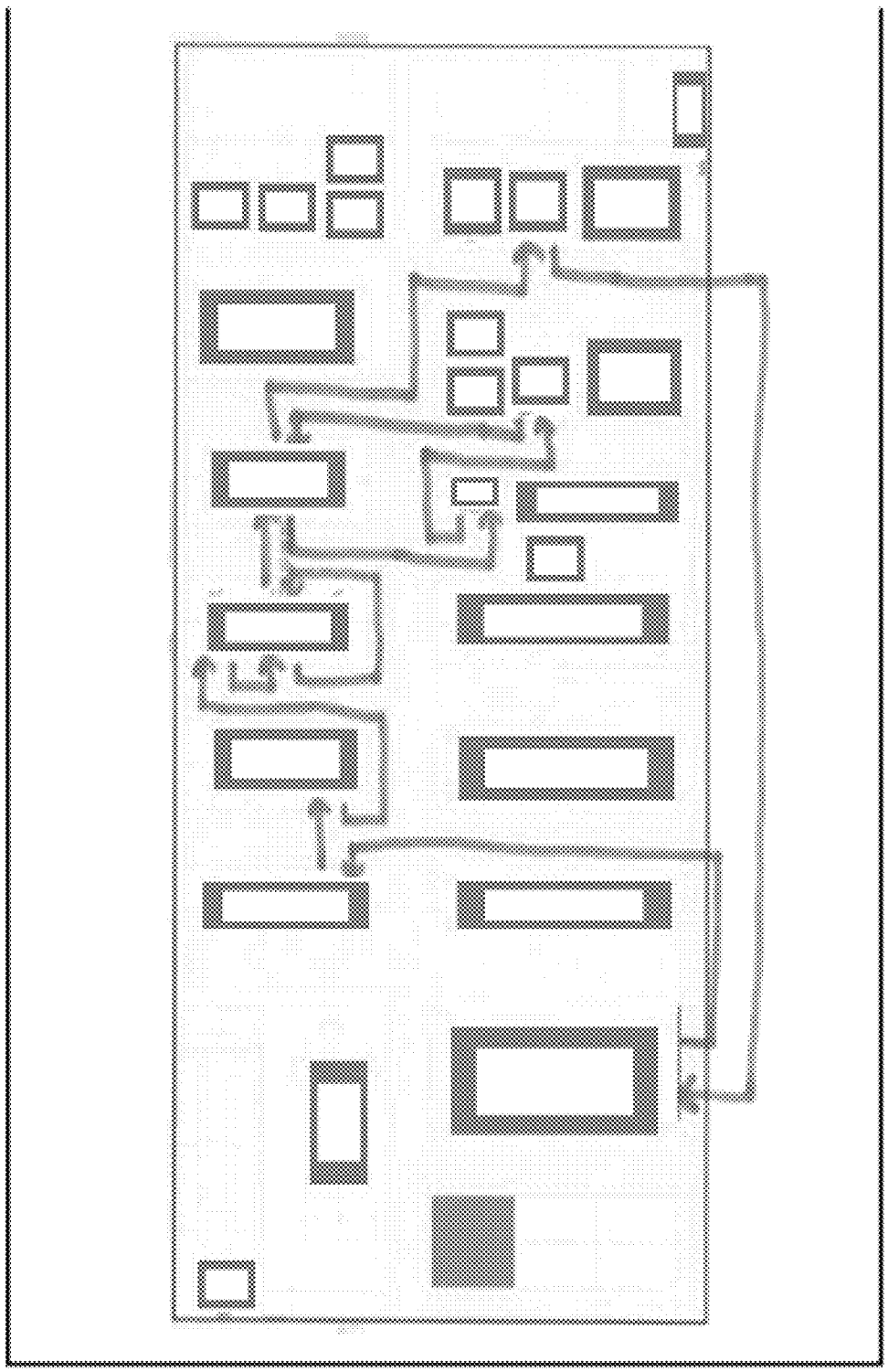
FIG. 7(b) illustrates an example of a parts-pick route, with lines indicating the fixed-route based distance that needs to be travelled by workers after executing the example implementation.

FIG. 7(a) illustrates an example of a parts-pickup route for a lot, with lines indicating the non-fixed route based on distance travelled by worker to pick-up the parts. FIG. 7(b) illustrates an example of a parts-pick route, with lines indicating the fixed-route based distance that needs to be travelled by workers after executing the example implementation.

Figure 8:
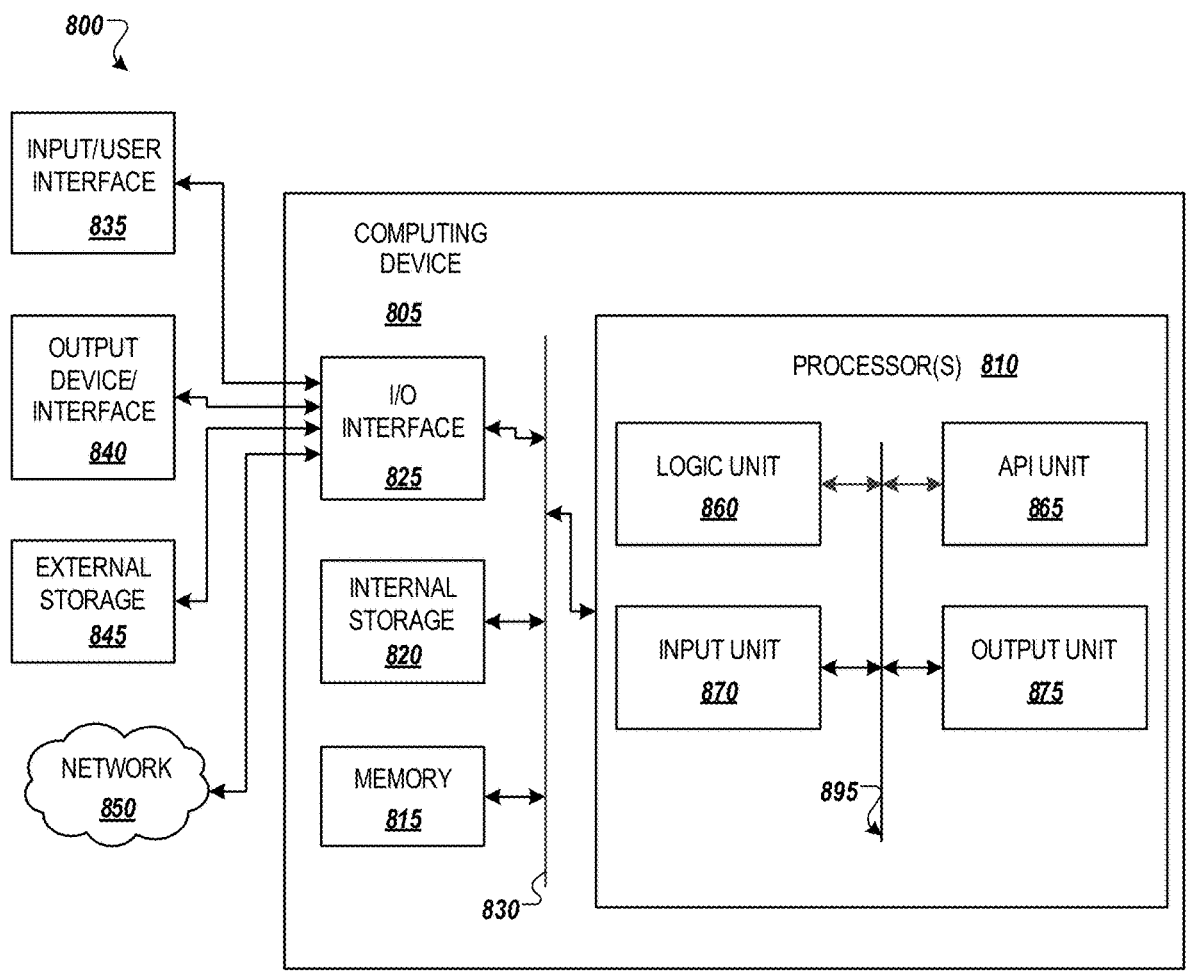
FIG. 8 illustrates an example computing environment with an example computer device suitable for use in example implementations.

FIG. 8 illustrates an example computing environment with an example computer device suitable for use in example implementations, such as a management system for managing a manufacturing floor and/or a device for a worker with an application to receive instructions from the management system. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805. In example implementations involving a touch screen display, a television display, or any other form of display, the display is configured to provide a user interface as illustrated, for example, at FIGS. 1 and 3-7(b).

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Memory 815 may be configured to store or manage algorithms to be executed by processor(s) 810 as described in the flow, for example, at FIG. 2 and FIG. 13. The example implementations as described herein may be conducted singularly, or in any combination of each other according to the desired implementation and are not limited to a particular example implementation.

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of physical processors or central processing units (CPU) that is configured to execute instructions loaded from Memory 815.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

In example implementations, processor(s) 810 is configured execute a lot ordering and route optimization for each of a plurality of workers on a manufacturing floor comprising a plurality of lots associated with a plurality of racks; determine rack placement of the plurality of racks and total travel distance for the each of the plurality of workers; generate a deployment plan for the each of the plurality of workers from the lot ordering, the route optimization, the rack placement, and the total travel distance, the deployment plan involving a pick-up route and a schedule for the each of the plurality of workers; provide the deployment plan to an interface configured to receive modifications to the deployment plan; and upon receiving instructions to deploy the deployment plan through the interface, provide the deployment plan to a device of each of the plurality of workers as illustrated in the flow diagram of planning system 205 and planner 200 of FIG. 2.

Processor(s) 810 can be configured to generate a rack filling plan based on frequent patterns set, individual item frequencies and priority within racks, wherein the frequent patterns set is derived from feedback of historical data of the plurality of lots received from a database intaking data from the device of the each of the plurality of workers as illustrated in the flow diagram of planning system 205 and planner 200 of FIG. 2.

Processor(s) 810 can be configured to determine the rack placement and the total travel distance by identifying, for the rack placement, ones of the plurality of racks that minimize the total travel distance based on the lot ordering and route optimization; wherein the processor(s) 810 is configured to generate the deployment plan comprises generating a schedule for delivery of items to the identified ones of the plurality of racks that minimize the total travel distance based on a frequent pattern set, individual item frequencies and priority within the ones of the plurality of racks as illustrated in the flow diagram of planning system 205 and planner 200 of FIG. 2.

Further, the processor(s) 810 can be configured to revise the frequent pattern set based on data received from the device of the each of the plurality of workers and updating the scheduling for the delivery of items to the identified ones of the plurality of racks based on the revised frequent pattern set as illustrated in the flow diagram of planning system 205 and planner 200 of FIG. 2.

Processor(s) 810 can be configured to execute the lot ordering and the route optimization by applying an FP-Max algorithm on a database of items associated to be delivered to determine frequent maximal itemsets; sorting the frequent maximal itemsets based on length; removing already selected items from the sorted frequent maximal itemsets; and refining the frequent maximal itemsets until all items are distributed to the plurality of lots; and adopting ones of the sorted and refined frequent maximal itemsets for the lot ordering as illustrated in the flow diagram of planning system 205 and planner 200 of FIG. 2.

Processor(s) 810 can be configured to, in response to receiving one or more constraints through the interface: update the lot ordering and the route optimization for each of the plurality of workers based on the one or more constraints; update the rack placement and the total travel distance for the each of the plurality of workers based on the one or more constraints; and modify the deployment plan based on the updates to the lot ordering, the route optimization, the rack placement, and the total travel distance as illustrated in the flow diagram of planning system 205 and planner 200 of FIG. 2.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
executing an item ordering for a plurality of lots and route optimization for each of a plurality of workers on a manufacturing floor, the manufacturing floor comprising a plurality of items disposed amongst a plurality of racks, wherein each lot of the plurality of lots comprises an itemset of the plurality of items;
determining rack placement of the plurality of racks and total travel distance for the each of the plurality of workers;
determining frequent patterns sets indicating items of the plurality of items more likely to be included in a respective itemset of the plurality of lots than other items of the plurality of items;
determining individual item frequencies within the plurality of racks and individual item priority within the plurality of racks;
generating a rack filling plan for item placement amongst the plurality of racks based on frequent patterns sets, individual item frequencies and priority within racks;
generating a deployment plan for the each of the plurality of workers from the item ordering, the route optimization, the rack placement, the rack filling plan, avoidance of collision/congestion between the plurality of workers, and the total travel distance, the deployment plan comprising an order list of pick-up items for each lot, an optimized route, and a schedule for the each of the plurality of workers;
providing the deployment plan to an interface configured to receive modifications to the deployment plan;
upon receiving instructions to deploy the deployment plan through the interface, providing the deployment plan to a device of each of the plurality of workers;
receiving feedback data of the plurality of lots from the device of each of the plurality of workers based, in part, on executing the deployment plan;
generating a visualization for display with the interface based on the deployment plan by:

displaying floor map of the manufacturing floor in a first region of the visualization, the floor map comprising the plurality of racks having the plurality of items disposed therein;

displaying, in the first region, a visualization of aggregated trajectories of the plurality of workers on the floor map according to a first color scheme that assigns segments of the aggregated trajectories different colors based on a frequency of the plurality of workers in each respective segment; and while the plurality of workers execute each deployment plan:

receiving an input in the first region selecting at least one of the segments on the floor map to be blocked, and in response to receiving the input, updating the item ordering, the route optimization, the rack placement, and the total travel distance for each of the plurality of workers to avoid the selected at least one of the segments and automatically re-generating the deployment plan based on the updates to the item ordering, the route optimization, the rack placement, and the total travel distance, wherein the frequent patterns sets are derived from historical data of the plurality of lots received from a database intaking the feedback data from the device of each of the plurality of workers.

2. The method of claim 1, wherein the determining the rack placement and the total travel distance comprises identifying, for the rack placement, ones of the plurality of racks that minimize the total travel distance based on the item ordering and route optimization;

wherein the generating the deployment plan comprises generating a schedule for delivery of items to the identified ones of the plurality of racks that minimize the total travel distance based on the frequent patterns sets, individual item frequencies and priority within the ones of the plurality of racks.

3. The method of claim 2, further comprising revising the frequent patterns sets based on data received from the device of the each of the plurality of workers and updating the scheduling for the delivery of items to the identified ones of the plurality of racks based on the revised frequent patterns sets.

4. The method of claim 1, wherein the executing the item ordering and the route optimization comprises:

applying an FP-Max algorithm on a database of items associated to be delivered to determine frequent maximal itemsets;

sorting the frequent maximal itemsets based on length;

iteratively selecting the frequent maximal itemset having the largest length and removing the selected items from the sorted frequent maximal itemsets; and iteratively refining the remaining frequent maximal itemsets until all items are distributed to the plurality of lots; and adopting ones of the sorted and refined frequent maximal itemsets for the item ordering.

5. The method of claim 1, further comprising, in response to receiving one or more constraints through the interface:

updating the item ordering and the route optimization for each of the plurality of workers based on the one or more constraints;

updating the rack placement and the total travel distance for the each of the plurality of workers based on the one or more constraints; and modifying the deployment plan based on the updates to the item lot ordering, the route optimization, the rack placement, and the total travel distance.

6. A non-transitory computer readable medium storing instructions for executing a process, the instructions comprising:

executing item ordering for a plurality of lots and route optimization for each of a plurality of workers on a manufacturing floor, the manufacturing floor comprising a plurality of items disposed amongst a plurality of racks, wherein each lot of the plurality of lots comprises an itemset of the plurality of items;

determining rack placement of the plurality of racks and total travel distance for the each of the plurality of workers;

determining frequent patterns sets indicating items of the plurality of items more likely to be included in a respective itemset of the plurality of lots than other items of the plurality of items;

determining individual item frequencies within the plurality of racks and individual item priority within the plurality of racks;

generating a rack filling plan for item placement amongst the plurality of racks based on frequent patterns sets, individual item frequencies and priority within racks;

generating a deployment plan for the each of the plurality of workers from the item ordering, the route optimization, the rack placement, the rack filling plan, avoidance of collision/congestion between the plurality of workers, and the total travel distance, the deployment plan comprising an order list of pick-up items for each lot, an optimized route, and a schedule for the each of the plurality of workers;

providing the deployment plan to an interface configured to receive modifications to the deployment plan;

upon receiving instructions to deploy the deployment plan through the interface, providing the deployment plan to a device of each of the plurality of workers;

receiving feedback data of the plurality of lots from the device of each of the plurality of workers based, in part, on executing the deployment plan;

generating a visualization for display with the interface based on the deployment plan by:

displaying floor map of the manufacturing floor in a first region of the visualization, the floor map comprising the plurality of racks having the plurality of items disposed therein;

displaying, in the first region, a visualization of aggregated trajectories of the plurality of workers on the floor map according to a first color scheme that assigns segments of the aggregated trajectories different colors based on a frequency of the plurality of workers in each respective segment; and while the plurality of workers execute each deployment plan:

receiving an input in the first region selecting at least one of the segments on the floor map to be blocked, and in response to receiving the input, updating the item ordering, the route optimization, the rack placement, and the total travel distance for each of the plurality of workers to avoid the selected at least one of the segments and automatically re-generating the deployment plan based on the updates to the item ordering, the route optimization, the rack placement, and the total travel distance, wherein the frequent patterns sets are derived from historical data of the plurality of lots received from a database intaking the feedback data from the device of each of the plurality of workers.

7. The non-transitory computer readable medium of claim 6, wherein the determining the rack placement and the total travel distance comprises identifying, for the rack placement, ones of the plurality of racks that minimize the total travel distance based on the item ordering and route optimization;
  wherein the generating the deployment plan comprises generating a schedule for delivery of items to the identified ones of the plurality of racks that minimize the total travel distance based on the frequent patterns sets, individual item frequencies and priority within the ones of the plurality of racks.

8. The non-transitory computer readable medium of claim 7, the instructions further comprising revising the frequent patterns sets based on data received from the device of the each of the plurality of workers and updating the scheduling for the delivery of items to the identified ones of the plurality of racks based on the revised frequent patterns sets.

9. The non-transitory computer readable medium of claim 6, wherein the executing the item ordering and the route optimization comprises:
  applying an FP-Max algorithm on a database of items associated to be delivered to determine frequent maximal itemsets;
  sorting the frequent maximal itemsets based on length;
  iteratively selecting the frequent maximal itemset having the largest length and removing the selected items from the sorted frequent maximal itemsets; and
  iteratively refining the remaining frequent maximal itemsets until all items are distributed to the plurality of lots; and
  adopting ones of the sorted and refined frequent maximal itemsets for the lot ordering.

10. The non-transitory computer readable medium of claim 6, the instructions further comprising, in response to receiving one or more constraints through the interface:
  updating the item ordering and the route optimization for each of the plurality of workers based on the one or more constraints;
  updating the rack placement and the total travel distance for the each of the plurality of workers based on the one or more constraints; and
  modifying the deployment plan based on the updates to the item ordering, the route optimization, the rack placement, and the total travel distance.

11. A management system, comprising:
  a processor, configured to:
    execute item ordering for a plurality of lots and route optimization for each of a plurality of workers on a manufacturing floor, the manufacturing floor comprising a plurality of items disposed amongst a plurality of racks, wherein each lot of the plurality of lots comprises an itemset of the plurality of items;
    determine rack placement of the plurality of racks and total travel distance for the each of the plurality of workers;
    determine frequent patterns sets indicating items of the plurality of items more likely to be included in a respective itemset of the plurality of lots than other items of the plurality of items;
    determine individual item frequencies within the plurality of racks and individual item priority within the plurality of racks;
    generate a rack filling plan for item placement amongst the plurality of racks based on frequent patterns sets, individual item frequencies and priority within racks;
    generate a deployment plan for the each of the plurality of workers from the lot item ordering, the route optimization, the rack placement, the rack filling plan, avoidance of collision/congestion between the plurality of workers, and the total travel distance, the deployment plan comprising an order list of pick-up items for each lot, an optimized route, and a schedule for the each of the plurality of workers;
    provide the deployment plan to an interface configured to receive modifications to the deployment plan;
    upon receiving instructions to deploy the deployment plan through the interface, provide the deployment plan to a device of each of the plurality of workers;
    receive feedback data of the plurality of lots from the device of each of the plurality of workers based, in part, on executing the deployment plan;
    generate a visualization for display with the interface based on the deployment plan by:
      displaying floor map of the manufacturing floor in a first region of the visualization, the floor map comprising the plurality of racks having the plurality of items disposed therein;
      displaying, in the first region, a visualization of aggregated trajectories of the plurality of workers on the floor map according to a first color scheme that assigns segments of the aggregated trajectories different colors based on a frequency of the plurality of workers in each respective segment; and
    while the plurality of workers execute each deployment plan:
      receive an input in the first region selecting at least one of the segments on the floor map to be blocked, and
      in response to receiving the input, update the item ordering, the route optimization, the rack placement, and the total travel distance for each of the plurality of workers to avoid the selected at least one of the segments and automatically re-generate the deployment plan based on the updates to the item ordering, the route optimization, the rack placement, and the total travel distance,
    wherein the frequent patterns sets are derived from historical data of the plurality of lots received from a database intaking the feedback data from the device of each of the plurality of workers.

12. The management system of claim 11, wherein the processor is configured to determine the rack placement and the total travel distance by identifying, for the rack placement, ones of the plurality of racks that minimize the total travel distance based on the item ordering and route optimization;
  wherein the processor is configured to generate the deployment plan comprises generating a schedule for delivery of items to the identified ones of the plurality of racks that minimize the total travel distance based on the frequent patterns sets, individual item frequencies and priority within the ones of the plurality of racks.

13. The management system of claim 12, the processor is configured to revise the frequent patterns sets based on data received from the device of the each of the plurality of workers and updating the scheduling for the delivery of items to the identified ones of the plurality of racks based on the revised frequent patterns sets.

14. The management system of claim 11, wherein the processor is configured to execute the item ordering and the route optimization by:
applying an FP-Max algorithm on a database of items associated to be delivered to determine frequent maximal itemsets;
sorting the frequent maximal itemsets based on length;
iteratively selecting the frequent maximal itemset having the largest length and removing the selected items from the sorted frequent maximal itemsets; and
iteratively refining the remaining frequent maximal itemsets until all items are distributed to the plurality of lots; and
adopting ones of the sorted and refined frequent maximal itemsets for the lot ordering.

15. The management system of claim 11, the processor further configured to, in response to receiving one or more constraints through the interface:
update the item ordering and the route optimization for each of the plurality of workers based on the one or more constraints;
update the rack placement and the total travel distance for the each of the plurality of workers based on the one or more constraints; and
modify the deployment plan based on the updates to the item ordering, the route optimization, the rack placement, and the total travel distance.

16. The method of claim 1, wherein generating a visualization for display with the interface based on the deployment plan further comprises:
displaying, in the first region, a visualization of associations between the plurality of lots according to a second color scheme based on the frequent patterns sets, wherein, in response to selecting a lot on the interface, each rack is assigned a color of a plurality of colors based on a frequency of items disposed within each respective rack being included in an itemset of the selected lot; and
in response to receiving an input in the first region on the interface, updating the displayed aggregated visualization of trajectories and the visualization of associations between the plurality of lots, wherein the input comprises rearranging item placement within the plurality of rack racks to update the rack filling plan.

* * * * *